United States Patent [19]

Gustavsen

[11] Patent Number: 5,181,731
[45] Date of Patent: Jan. 26, 1993

[54] PIVOTABLE CART

[76] Inventor: Willard Gustavsen, 12142 Rangeline, Berrien Springs, Mich. 49103

[21] Appl. No.: 753,396

[22] Filed: Aug. 30, 1991

[51] Int. Cl.$^5$ .............................................. B62B 1/04
[52] U.S. Cl. ................................. 280/47.131; 280/35; 280/63; 280/639; 280/652
[58] Field of Search ...................... 280/47.131, 63, 35, 280/639, 652, 78

[56] References Cited

U.S. PATENT DOCUMENTS

| 1,468,768 | 9/1923 | Vogel et al. | 280/63 |
| 2,375,338 | 5/1945 | Alexander | 280/47.131 |
| 2,546,604 | 3/1951 | Lafky | 280/78 |
| 3,603,608 | 9/1971 | Kirkpatrick | 280/47.131 |
| 3,860,254 | 1/1975 | Wegener | 280/652 |

FOREIGN PATENT DOCUMENTS 2601424 7/1977 Fed. Rep. of Germany ...... 280/652

Primary Examiner—Eric D. Culbreth
Attorney, Agent, or Firm—Dykema Gossett

[57] ABSTRACT

A pivotable cart is disclosed which has a first and second support members for supporting a rolled material. The first and second support members are pivotable relative to each other to a storage position. In the pivoted storage position, the cart requires a minimum amount of space. The cart may be easily pivotable outwardly to a use position where it will adequately support an elongate rolled material. The support members are preferably identical, and connected to a pair of spaced wheels such that the support members pivot about the wheel axis relative to each other. A chain prevents the two support members from pivoting relative to each other beyond a predetermined amount. Further, the support members each include a support surface having a generally V-shape with an apex aligned with an apex of the other support member to provide a ditch for support of the coiled material. The apex on each of the support members are spaced laterally inwardly from a cross member connecting the support structure to a wheel bushing. In this way the weight of the carpet is borne laterally between the cross members such that the cart adequately supports the weight.

4 Claims, 2 Drawing Sheets

PIVOTABLE CART

BACKGROUND OF THE INVENTION

This application in general relates to a cart which pivots to a storage position to reduce its size.

Wheeled carts for transporting large rolled materials, such as carpet, are utilized by installers. The rolls are typically of a relatively long axial length, and carts for transporting the rolls must provide support at spaced axial locations. Since the carts support the rolls at relatively widely spaced locations, they are relatively large.

The cart's relatively large size is undesirable. Space is often at premium, as an example when the cart is transported in a vehicle, and it would be desirable to reduce the size of the cart.

SUMMARY OF THE INVENTION

A disclosed cart has two spaced support members for supporting a member to be transported. The support members are spaced by a first distance when in a work position, and are movable to a storage position where the support members are spaced by a lesser distance.

More particularly, two wheels support the support members and rotate about a single axis. The two support members pivot on the wheel axis, away from each other to a work position, and towards each other to a storage position.

More preferably, a chain secures the two support members such that they cannot pivot away from each other beyond a predetermined point. In this way, the cart may be pivoted to its storage position and stored in a relatively small area. At a job site the two support surfaces are pivoted relative to each other to a work position, where they support a member, such as an elongate rolled material, at adequately spaced axial locations.

In a preferred embodiment, each of the support members comprise a support surface extending generally parallel to the axis of the wheels. A cross member extends from the support surface to a wheel bushing. The first and second support members are preferably generally identical in construction, thus reducing the number of different parts. Most preferably, the cross members are fixed to the wheel bushing at a position spaced laterally inwardly from the wheel.

The support surface is generally in the shape of a V. The apex of the V is spaced laterally inwardly from the cross member. The two support members are reversed on the wheel axis such that apexes of the two are generally aligned and along an axis perpendicular to, and spaced from, the axis of rotation of the wheels.

When a roll of material is supported on the support surfaces, it is received within these apexes. Thus, the weight of the material is borne laterally inwardly of the cross members, such that the pivotable cart may easily support the weight.

These and other objects of the present invention can be best understood from the following specification and drawings, of which the following is a brief description.

DETAILED DESCRIPTION OF A PREFERRED EMBODIMENT

Figure 1:
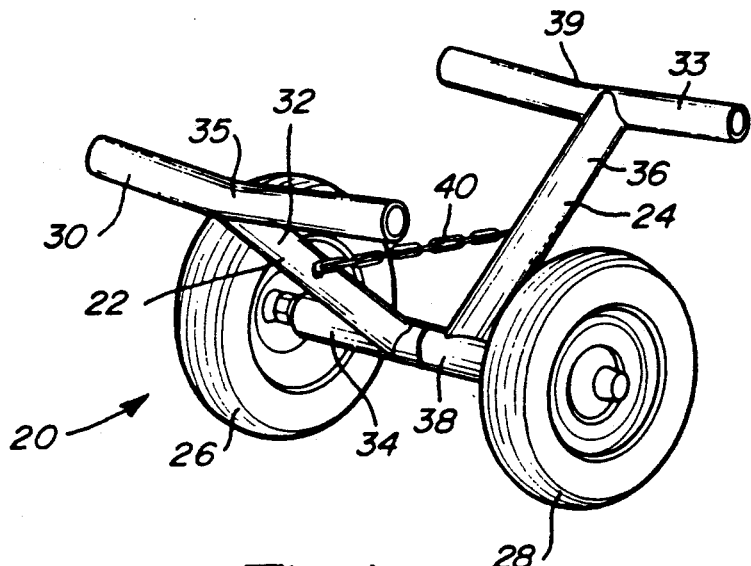
FIG. 1 is a perspective view of an inventive cart.

A pivotable cart 20 is illustrated in FIG. 1 having a first support member 22 spaced from a second support member 24. First support member 22 is supported by a wheel 26 while second support member 24 is supported by wheel 28. First support member 22 has a support surface 30 which is connected to a cross member 32, which is in turn connected to a wheel bushing 34. Similarly, support member 24 consists of support surface 33 having cross member 36 connected to wheel bushing 38.

A chain 40 connects support members 22 and 24, preventing undue outward pivoting movement between the two. Support member 22 may pivot towards support member 24 to a storage position, but chain 40 will prevent any further outward pivoting beyond that illustrated in FIG. 1.

Figure 2:
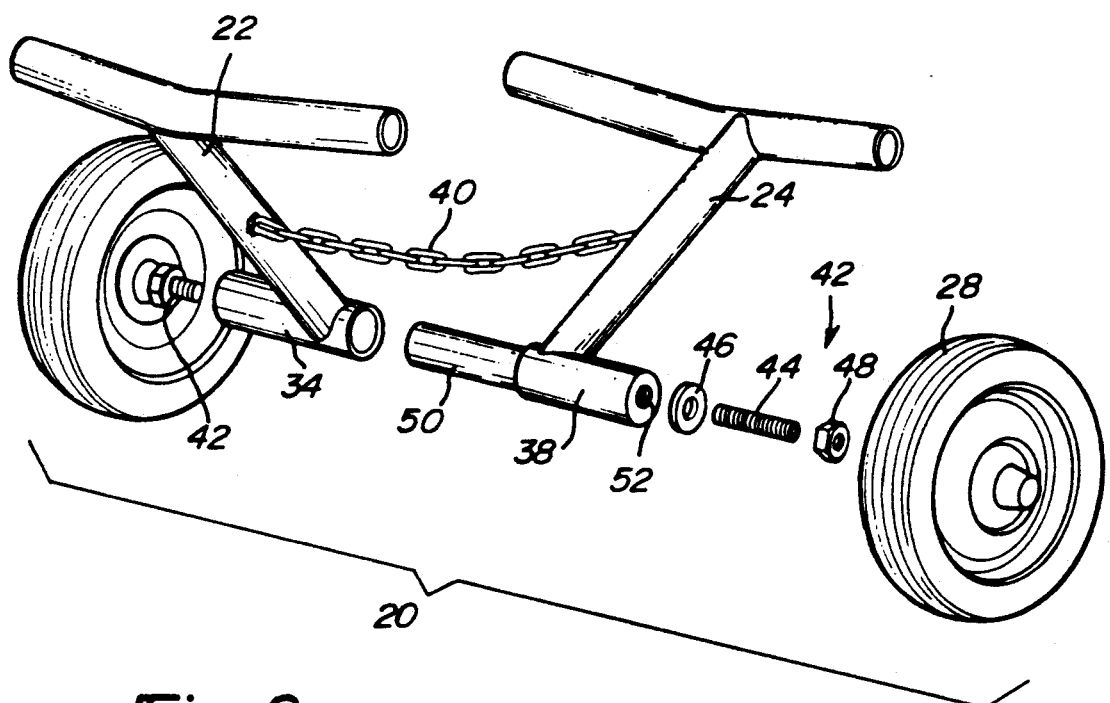
FIG. 2 is an exploded view of the cart illustrated in FIG. 1.

FIG. 2 is an exploded view of cart 20 having support members 22 and 24. Support members 22 and 24 are generally identical. Bolt assemblies 42 attach wheels 26 and 28 within wheel bushing 34 and 38, respectively. Wheels 26 and 28 rotate relative to bolt assemblies 42. Bolt assembly 42 consist of bolt 44, washer 46 and nut 48. Bolt 44 is received within threads 52 formed within a spacer 50. Spacer 50 is interference fit within an inner periphery of wheel bushing 38, and may freely turn within wheel bushing 34. Wheels 26 and 28 are thus attached to support surfaces 22 and 24, but may rotate independently of bolt assembly 42, and support surfaces 22 and 24.

Figure 3:
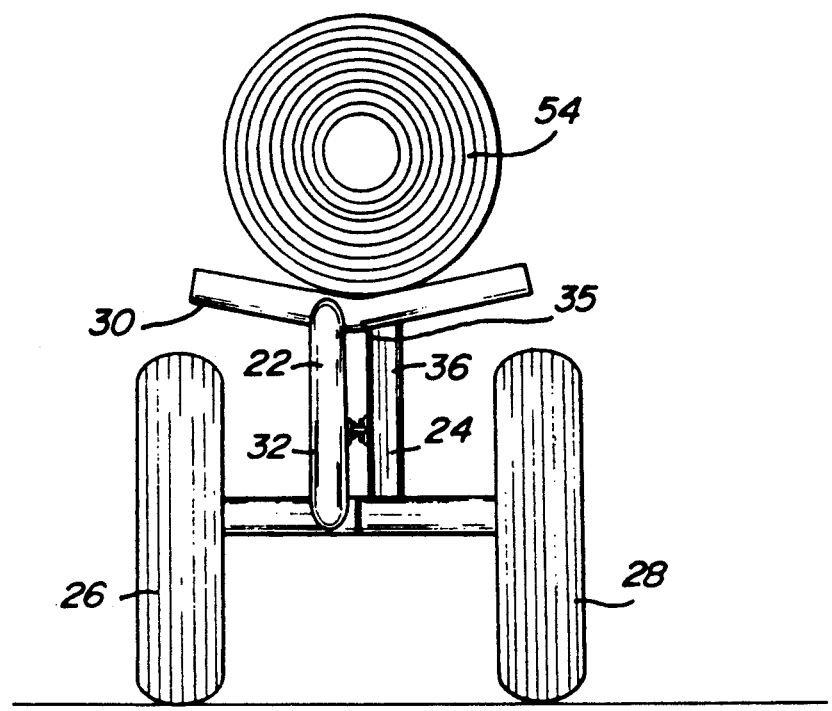
FIG. 3 is an end view of the cart supporting a rolled material.

As shown in FIG. 3, support surface 30 supports a roll of material 54 at apex 35. Support member 24 has its apex, not shown, aligned with apex 35 and supporting roll 54.

Support surface 30 includes apex 35. Similarly support surface 33 includes apex 39. Apexes 35 and 39 are the vertically lowermost portions of support surfaces 30 and 33, respectively. Support surfaces 30 and 33 are generally slightly V-shaped, with sides extending upwardly from the apexes.

Figure 4:
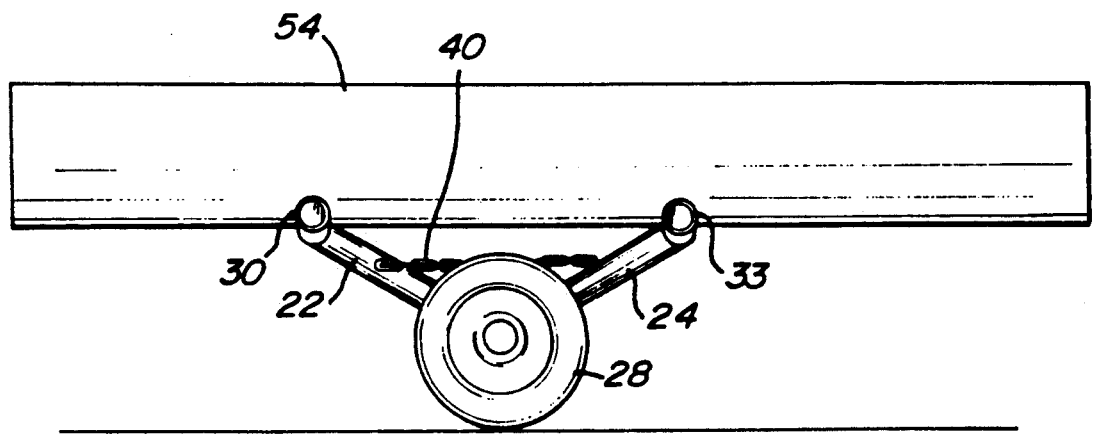
FIG. 4 is a side view of the cart illustrated in FIG. 3.

As shown in FIG. 4, support members 22 and 24 are pivoted outwardly relative to each other to the use position where they support roll 54. Chain 40 prevents further outward pivotal movement. An installer may transport roll 54 by pushing on one axial end. The installer balances roll 54 on the aligned wheels 26 and 28. Support surfaces 30 and 33 are spaced by an adequate distance to adequately support roll 54.

Since apexes 35 and 39 are aligned they provide a ditch to receive and support roll 54. The portions of support surfaces 30 and 33 extending away from the apexes maintain coil 54 aligned in the apexes. Further, the weight of roll 54 is centered at a lateral position between cross members 32 and 36.

When an installer has finished transporting rolled material 54, he merely pivots support member 22 relative to support member 24 such that cart 20 may be stored in a smaller area. In this way, a relatively large roll of material is supported on a device which may be stored in a relatively small area.

Although the cart is disclosed for use with roller materials, it should be understood that any elongate items could be transported. As an example, a canoe or similar may be carried on a cart within the scope of this invention.

A preferred embodiment of the present invention has been disclosed, however, a worker of ordinary skill in the art would recognize that certain modifications would come within the scope of this invention. For that reason the following claims should be studied in order to determine the true scope and content of this invention.

I claim:

1. A cart comprising:

a first support member spaced from a second support member;

said first and second support members being supported by at least one wheel such that a member may be placed on said first and second support members in a use position and transported on said at least one wheel;

said first and second support members being spaced from each other in a use position by a first distance, and being movable towards each other to a storage position where they are spaced by a distance less than said first distance;

a pair of said wheels which are rotatable about a single axis, and said first and second support members pivot relative to each other about said axis to said storage position; and said support members including a wheel bushing which receives a spacer, said spacer being force fit into the wheel bushing of said second support member, said spacer being freely rotatable within the wheel bushing of said first support member, and said spacer having threads at each end with said wheels being attached to said threads.

2. A cart comprising:

a first support member and a second support member, said first and second support members each having wheel bushings rotatably supporting a wheel, a lateral midpoint being defined between said wheels, said wheel bushing of said first support member being spaced towards a first side of side cart from said wheel bushing of said second support member, a cross member extending from each of said wheel bushings to a support surface, said cross members of said first and second support members being equally spaced in opposite directions from said lateral midpoint, with said cross member of said first support member being spaced toward said first side from said lateral midpoint;

said wheels being rotatable about a single axis, and said first and second support members being capable of pivoting relative to each other about said axis to a storage position;

said first and second support members being of identical construction;

each said support surface being generally V-shaped with an apex spaced laterally inwardly of respective ones of said cross members, and said cross members being positioned laterally inwardly of said wheels, such that a member supported on said support surfaces will be received in said apexes of said first and second support member, and laterally between said cross members; and said apex on said first support member and said apex on said second support member being aligned at said lateral midpoint.

3. A cart as recited in claim 2, wherein a device for preventing pivoting of said first and second support members relative to each other beyond a predetermined maximum pivoted relationship is provided.

4. A cart as recited in claim 3, wherein said device is a chain.

* * * * *